United States Patent [19]

Arora et al.

[11] Patent Number: 5,812,552
[45] Date of Patent: Sep. 22, 1998

[54] METHOD AND APPARATUS FOR DYNAMICALLY FORMING MULTIMEDIA EMULATED LOCAL AREA NETWORKS

[76] Inventors: Vivek Arora, 65 County Rd., #O-98, Cliffwood, N.J. 07721; Larry H. Chang, 12 London Pl., Somerset, N.J. 08873; Seyhan Civanlar, 85 Coleman Ave., Red Bank, N.J. 07701; Vikram R. Saksena, 31 Tuscan Dr., Freehold, N.J. 07728; Agnes C. Tow, 9 Doranne La., Middletown, N.J. 07748

[21] Appl. No.: 618,483

[22] Filed: Mar. 19, 1996

[51] Int. Cl.$^6$ .................................................. H04L 12/28
[52] U.S. Cl. .......................................... 370/401; 370/395
[58] Field of Search ..................................... 370/390, 391, 370/395, 396, 397, 398, 401, 402, 406, 410, 411, 465, 474, 399, 467

[56] References Cited

U.S. PATENT DOCUMENTS

| 5,361,256 | 11/1994 | Doeringer et al. | 370/390 |
| 5,394,402 | 2/1995 | Ross | 370/402 |
| 5,600,644 | 2/1997 | Chang et al. | 370/404 |
| 5,633,869 | 5/1997 | Burnett et al. | 370/396 |

OTHER PUBLICATIONS

"LAN Emulation Over ATM Specification—Version 1.0", *ATM Forum*, 94–0035R9.

*Primary Examiner*—Wellington Chin
*Assistant Examiner*—Soon-Dung Hyun
*Attorney, Agent, or Firm*—Stephen M. Gurey

[57] ABSTRACT

A temporary multimedia ELAN is formed on top of one or more existing ELANs between those end-stations (121-1, 121-2, 111-1) participating in a multimedia session, such as a video conference, at the time of initiating the session. At the end of the session the temporary ELAN is torn down. When the temporary ELAN is created an available LAN Emulation Server (LES) (241) and an available Broadcast and Unknown Server (BUS) (243) are allocated to serve those end-stations participating in the multimedia session. The BUS also serves as a multicast server to multicast a multimedia stream from one end-station to each other end-station on the temporary ELAN. The initiator of a session accesses a Multimedia Session Manager (401), which oversees and manages the session and coordinates the necessary resources. An ELAN Configuration (402) serves to dynamically assign IP addresses to end-stations to ensure that each end-station on the temporary ELAN is on a single subnet, to receive the configuration attributes of each end-station that is to be connected on the temporary ELAN, to find an available LES and BUS to serve the temporary multimedia ELAN, and to coordinate establishment of the temporary ELAN between the end-stations. Once the temporary ELAN has been formed, a Conference Configurator (403) starts executing a multimedia application already existing on each end-station or sends the executables of the selected multimedia application in real time to each end-station. During the session the Multimedia Session Manager is used to add a new end-station, drop an end-station, and terminate the session.

45 Claims, 5 Drawing Sheets

METHOD AND APPARATUS FOR DYNAMICALLY FORMING MULTIMEDIA EMULATED LOCAL AREA NETWORKS

TECHNICAL FIELD

This invention relates to Asynchronous Transfer Mode (ATM) Emulated Local Area Networks (ELANs), and more particularly to the use of such networks for multimedia sessions between a number of end-stations.

BACKGROUND OF INVENTION

The current embedded base of data networks are based on IEEE 802 Local Area Networks, i.e., so-called "Legacy LANs". These Legacy LANs are "connectionless" because network entities exchange packets without establishment of a layer-2 connection. Many existing and emerging applications are designed to run primarily on legacy LANs. These applications reside on top of so-called "layer-2" and "layer-3" protocols such as Medium Access Control (MAC) and Internet Protocol (IP), respectively. As is well known in the art, the layers referred to are those of the International Standards Organization (ISO) seven-layer networking reference model.

Asynchronous Transfer Mode (ATM) with its a) fixed size cell switching, b) scalability from few megabits to hundreds of megabits, c) ability to offer guaranteed quality of service (QoS) on a per connection basis, and d) connection orientation, is viewed as the enabling technology for high-speed multimedia networking. Therefore, it is desired in the art to interconnect legacy LANs and ATM end-stations, to themselves and to each other, using ATM. This has been achieved in the prior art in a variety of ways.

Recently, the ATM Forum, an industry forum between manufacturers and users of the ATM technology, has developed a bridging implementation agreement called LAN Emulation (LANE) version 1.0 (see, e.g., LAN Emulation Over Specification-Version 1.0, ATM *Forum*, 94-0035R9). LANE 1.0 defines how ATM-attached and Legacy LAN-attached end-stations can communicate as if they are all on a single LAN. LANE defines (1) server entities which allow ATM to emulate a connectionless LAN environment; (2) the interface between ATM end-stations (the LAN Emulation Clients [LECs]) and the LANE servers; and (3) the interface between two LECs. In terms of the server components, LANE defines a LAN Emulation Server (LES), which performs MAC-to-ATM address resolution, i.e., translation; a Broadcast and Unknown Server (BUS), which performs data broadcasting; and an optional LAN Emulation Configuration Server (LECS) which performs initialization and configuration of an ELAN. These three servers are needed to mimic the Legacy LAN functionality. According to current LANE version 1.0 standards, one ELAN is served by a LES, a BUS and a LECS.

To describe LANE, consider the example shown in FIG. 1. In FIG. 1, bridge 100 connects to Ethernets 101 and 102, each representing the same logical subnet. LAN 101 connects end-stations 111-1, 111-2, and 111-3. Bridge 100, and end-stations 121-1, 121-2, 121-3 and 121-4 are all connected to ATM switch 117. Router 167, which is attached to Ethernet 101, is used to provide communications between the end-stations in the network of FIG. 1 and the Internet 170.

LAN Emulation allows the Legacy LAN-attached end-stations, e.g., 111-1, and ATM-attached end-stations, e.g., 121-2, to interwork transparently as if they are all in the same LAN. Being in the same LAN implies that the end-stations do not need to communicate via a router which performs layer-3 processing of data packets. It is known in the prior art that, as compared to ATM, routers are slow processing devices, and are thus undesirable on an ATM data path. The reason routers are used, however, is that LANs create broadcast traffic which becomes a problem when the size of the LAN grows. In such a case, LANs are separated by routers which isolate the broadcast traffic within each individual LAN. A bridge, on the other hand, is a layer-2 processing device which is very fast and allows segments of the same LAN to be interconnected. A bridge "learns" addresses on different LAN segments and can throttle the broadcast traffic to a certain degree.

Consider the case of end-station 111-1 sending a data packet to the Medium Access Control (MAC) address of end-station 121-2. Note that the MAC address is the layer-2 address defined for end-stations that use the MAC protocol for layer-2 communications. Each end-station on Ethernet 101, and consequently, bridge 100 receives the packet. If bridge 100 knows the ATM address of end-station 121-2 (via learning from a previous data exchange), it will a) encapsulate the received MAC packet using RFC-1483 specifications into ATM cells, b) build a virtual connection 133 via ATM switch 117 to communicate with end-station 121-2, and c) transmit the information to end-station 121-2 over the respective ATM connection 133. End-station 121-2 strips off the ATM encapsulation, converts the ATM cells into a MAC packet, and processes the MAC packet, just like an Ethernet attached end-station.

If bridge 100 does not know the ATM address of end-station 121-2, it will not be able to build a connection to end-station 121-2. Thus, it needs to obtain that address from LAN Emulation Server (LES) 141, which is a process well known in the prior art. Note that LES 141 contains the ATM to MAC address mapping of all registered end-station addresses in its database.

According to the terminology used by the ATM Forum, an ATM-attached end point (bridge or end-station) is called a LAN Emulation Client (LEC), while an ATM-attached bridge is called a proxy LAN Emulation Client (proxy-LEC). A proxy-LEC represents all the Legacy LAN attached end-stations behind itself by hiding their presence from the ATM network. Generally speaking, the term LEC is used to include the proxy-LECs and non proxy-LECs.

The ATM-attached bridge or end-station must perform certain procedures to participate in an ELAN. For example, at startup, bridge 100 (LEC) first builds a virtual connection 130 to LAN Emulation Configuration Server (LECS) 143, which is a process also well known in the prior art, and requests certain configuration parameters, including the ATM address of the LES serving the ELAN specified by the LEC. In turn, LECS 143 sends the ATM address of LES 141. Note that LECS 143 could be at an address well-known by all end-stations connected to ATM switch 117.

Once bridge 100 (or proxy-LEC 100) receives the ATM address of LES 141, it establishes virtual connection 131, and joins with the ELAN sending a so called LE_JOIN_REQUEST message, which allows the bridge 100 to register at least one MAC address and its own ATM address with LES 141. If the bridge 100 declares itself as a proxy-LEC, it will not need to register any more MAC addresses. Optionally, bridge 100 is allowed not to declare itself as a proxy-LEC, but simply as a non proxy-LEC, in which case it must register the MAC addresses of all its end-stations with the corresponding bridge output port's ATM address.

Once bridge 100 connects to LES 141, in turn, LES 141 adds bridge 100 as a leaf to its point-to-multipoint control distribute connection 139, which is well known in prior art.

After each LEC registers the MAC and ATM addresses, the LES is able to respond to address resolution requests (from a MAC address to an ATM address) of a LEC within the ELAN. If LES can't find the requested address in its database of registered entries, it will flood the request to all proxy-LECs since the end-station may be behind one of the proxy-LECs. When, for example, proxy-LEC 100 receives an address resolution request from LES 141, and if the requested MAC address belongs to end-station 111-3, proxy-LEC 100 responds to LES 141 with its own ATM address.

Broadcast and Unknown Server (BUS) 147 is another service component in an ELAN. When proxy- LEC 100 completes joining with LES 141, it requests the ATM address of the BUS 147 by sending an address resolution request to LES 141 for the broadcast MAC address known to have an all-ones ("11111 . . . 1") address. In response, LES 141 sends the ATM address of BUS 147 to proxy-LEC 100. Subsequently, proxy-LEC 100 builds a point-to-point virtual connection 135 to BUS 147. In turn, BUS 147 adds proxy-LEC 100 as a leaf to its point-to-multipoint virtual connection 138, which is well known in the prior art.

It should be noted that virtual connections 131,135,138 and 139 are permanent switched virtual connections, i.e., they are not torn down, as long as proxy-LEC 100 participates in the ELAN. If proxy-LEC 100 drops any of these connections, it will re-start with the configuration phase by reconnecting to LECS 143.

FIG. 2 is a simplified diagram showing connections between BUS 147 of FIG. 1, and LECs 121-1 -121-4 and bridge 100 through ATM switch 117, of FIG. 1. BUS 147 is used to distribute a) broadcast, b) multicast, and c) unknown data packets to all LECs (including proxy-LECs). Broadcast traffic is, by definition, originated by a LEC and targeted to all LECs in that ELAN. Thus, when LEC 121-1 has traffic to broadcast to all members of the ELAN, it sends the packet to BUS 147 on connection 151, which in turn distributes it to LECs 121-2, 121-3,1214 and bridge 100. Similarly, LECs 121-2,121-3, 121-4 and bridge 100 send broadcast data to BUS 147 for distribution over connections 152, 153,154 and 135, respectively. The distribution from BUS 147 is accomplished over Point-to-Multipoint (PtmP) connection 138 attached to BUS 147. As illustrated in FIG. 2, PtmP connection 138 allows BUS 147 to send a single copy of the broadcast packet to switch 117. In turn, switch 117 sends it to all end points by duplicating the packet on its ports to the end-stations. PtmP connection 138 is thus like a tree with a "root" on BUS 147 and leaves on LECs 121-1, 121-2,121-3, 1214 and bridge 100. The advantage of a PtmP connection with N leaves as opposed to N number of point-to-point connections is that, with the later method, the packet needs to be replicated N times by the root in order to send one copy on a point-to-point connection to each receiver. With a PtmP connection, the aforementioned replication is avoided, as only the switch copies the packet to all of its N ports.

Multicast traffic is usually originated by a LEC but destined to only a subset of LECs in the ELAN. Thus, broadcast can be viewed as a special case of multicast in which "all" LECs receive the traffic. A typical multicast traffic is a video transmission from a source to some set of receivers. When there is multicast traffic in an ELAN, the transmitting LEC sends the multicast traffic to BUS 147 which in turn broadcasts it on PtmP 138 to all members of the ELAN, namely 121-1,121-2,121-3,121-4 and bridge 100. The LECs which are not part of the multicast group simply discard the received packets, while receiver LECs which are in the multicast group receive and process the packet.

A multimedia application consists of audio, video and data streams. By nature, many multimedia applications are of multicast or broadcast type. Some typical multicast applications are video teleconferencing, video playback, multi-party white boarding, and video games.

The wide bandwidth requirements of multimedia applications make ATM a desirable choice as the transport protocol for multimedia applications. Since LAN Emulation provides the means to carry numerous layer-3 protocols encapsulated along with the layer-2 protocol on top of ATM, it is a well suited protocol for multimedia applications.

One of the key issues in supporting multimedia applications over ATM is the handling of multicast traffic efficiently. All multimedia applications require substantial bandwidth, usually larger than 1.5 Mbps per end-station, and require some form of point-to-multipoint transmission. Given that the multimedia traffic uses up a large portion of the ATM bandwidth, it is important to use methods by which virtual circuit utilization for such multimedia services are minimized and the performance bottlenecks are eliminated.

Considering a three-way conferencing application as an example, between, for example, end-stations 121-1, 121-2 and 111-1 in FIG. 1, there are several alternatives for handling three-way communications, which is a minimal form of multicast communications.

A first prior art method for transporting multimedia streams between multiple end-stations is to send the streams to the BUS. Since the broadcast and multicast traffic for the entire ELAN is carried via BUS 147, large streams of data or video cannot be sent via the BUS. The BUS is intended to be used for small broadcast streams that are normally seen on Legacy LANs such as an layer-3 to layer-2 address resolution packet (ARP), which is well known in prior art. The ELANs allow thousands of LECs to be supported, and thus BUS in its current form is not suited for application level broadcasts. Another deficiency of using BUS 147 for multicasting is that it can't treat the broadcast and multicast traffic differently in an ELAN. Thus, it sends the multicast traffic to all LECs in the ELAN. Also, BUS is a permanent shared resource dedicated to a single ELAN, and can't be reconfigured or duplicated on an as-needed basis.

Another prior art method for transporting multimedia streams between multiple end points is one in which end-station 121-1 builds separate point-to-point virtual connections to LEC 121-2 and end-station 111-1 (via bridge 100). These two connections are needed so that LEC 121-1 can send its multimedia stream (e.g., video) to both LEC 121-2 and end-station 111-1. Similarly LEC 121-2 builds separate point-to-point virtual connections to LEC 121-1 and end-station 111-1 (via bridge 100). Finally, bridge 100 builds point-to-point virtual connections to LECs 121-2 and 121-1 to forward end-station 111-1's packets. This networking results in a total of six point-to-point connections. For a more generalized case in which there are N end-stations, N×(N−1) point-to-point connections are required. Given that ATM connections are expensive, especially across the Wide Area Network (WAN), this solution, which is connection intensive, is not attractive.

In a third prior art method, a separate Video Multicast Server (VMS) 149 in FIG. 1, is implemented. Each end-station 121-1, 121-2 and 111-1 connects to VMS 149 to send its video stream, and VMS 149 distributes each received video stream to all other end points. Note that, the VMS solution requires N point-to-point connections so that senders send video to VMS 149, and a single PtmP connection in which VMS 149 is the root and the end-stations 121-1, 121-2 and 111-1 are the leaves. This solution is superior to the former one, as the connection utilization is linearly proportional with N as opposed to $N^2$ of the former solution. The deficiency of this method is that a separate server, co-existing with BUS, needs to be developed and supported within an ELAN just to support the multimedia services.

SUMMARY OF INVENTION

In accordance with the principles of the invention, the foregoing problems are overcome by employing a system which forms a temporary multimedia ELAN between the end points participating in a multimedia session at the time of initiating the session, and which is torn down when the multimedia session is completed. An end point which participates in the multimedia session becomes a LEC, if it is directly ATM attached. Otherwise, the ATM attached bridge that connects the non-ATM end-station to the ATM network becomes a proxy-LEC in the newly built multimedia ELAN. Creation of the new multimedia ELAN results in creation of new instances of the ELAN service entities, namely LES and BUS automatically.

In accordance with an aspect of the invention, these LESes and BUSes are allocated to serve only the members of the new temporary multimedia ELAN. Since the created BUS serves only those small number of LECs which are the participants of the multimedia session, it can be effectively used as a multicast server to multicast multimedia streams to all participants.

An aspect of this invention improves the performance of a multimedia session between a group of end points without dedicating permanent network resources by dynamically configuring an ELAN so as to provide router-less paths between the end points. The resource utilization efficiencies are improved by creatively using the newly created BUS in a new way, which is normally not designed for multicasting multimedia traffic for typical size (thousands of end points) ELANs.

Since the multimedia ELAN is configured to serve only the conferees of the multimedia session, it is a virtual network that operates at layer-2 of OSI model among the directly ATM-attached end-stations, thereby avoiding routers in the network which degrade performance. An innovative aspect of the invention is the use of the created Broadcast and Unknown Server (BUS) of the multimedia ELAN as a multicast server for the multimedia session, meaning that each multimedia data stream that needs to be sent to all end-stations is sent to the BUS, and the BUS through its point-to-multipoint multicast forward connection to all LECs in the multimedia ELAN, broadcasts each received multimedia stream to all end-stations. In fact, the formation of a small multimedia ELAN between end-stations on top of an existing ELAN is a creative way of using the BUS as a multicast server. A new multimedia ELAN is formed between the end-stations participating in the multimedia session so that the newly created BUS broadcasts only to the end points which are part of this new ELAN by using the new BUS as a multicast server, thereby preventing the multicast traffic from being transmitted to BUSes of the ELANs of all end-stations.

Since the BUS is attached to each LEC with a bidirectional point-to-point (PP) connection as well as a point-to-multipoint (PtmP) connection, the PP connection in the direction from the BUS to the LEC can be used as a control channel to dynamically adjust multimedia stream characteristics of a LEC, such as bandwidth and frame rate during the lifetime of a session.

DETAILED DESCRIPTION

Figure 1:
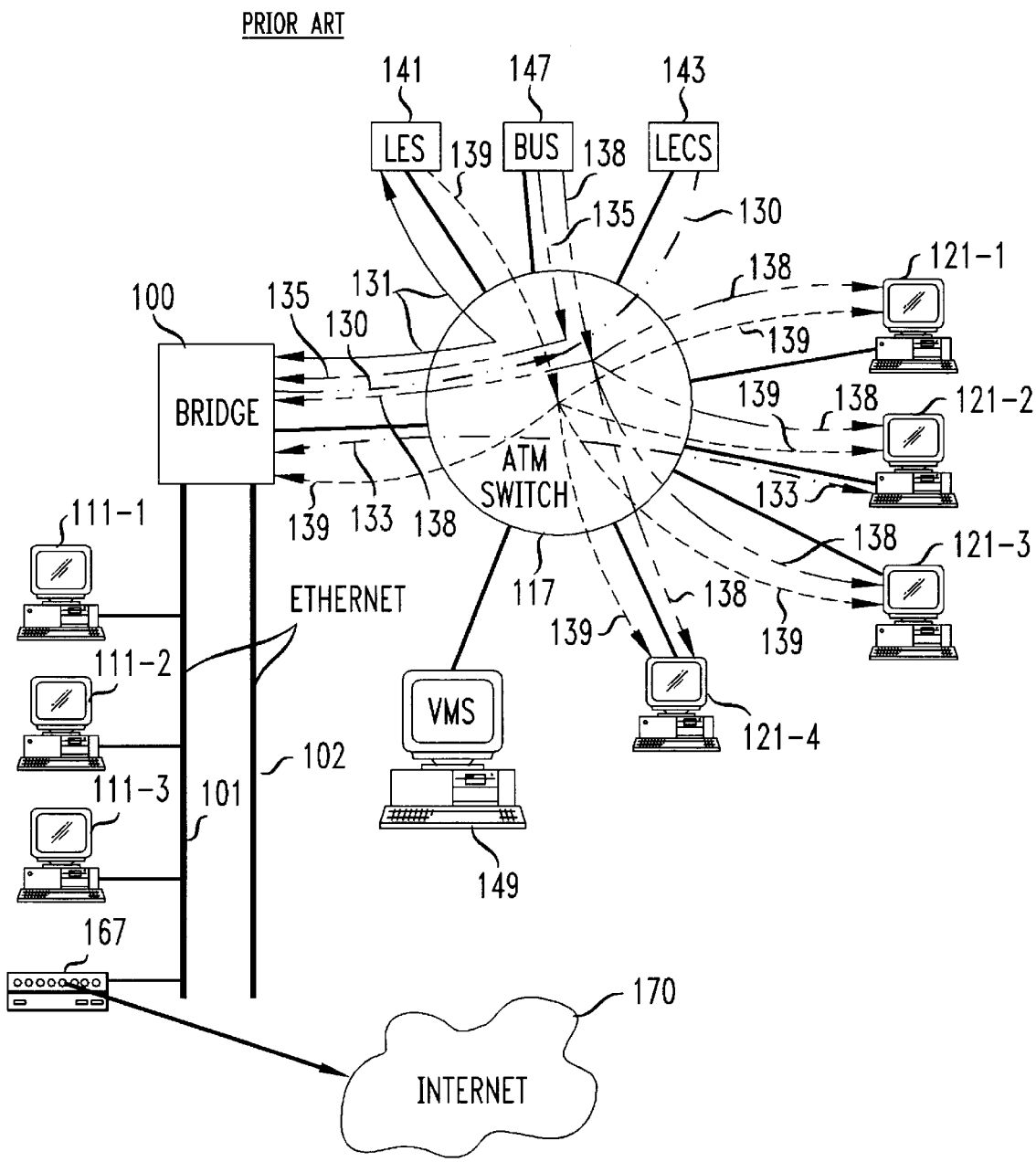
FIG. 1 shows a small prior art ELAN with ATM-attached and Legacy LAN attached end-stations.
Figure 2:
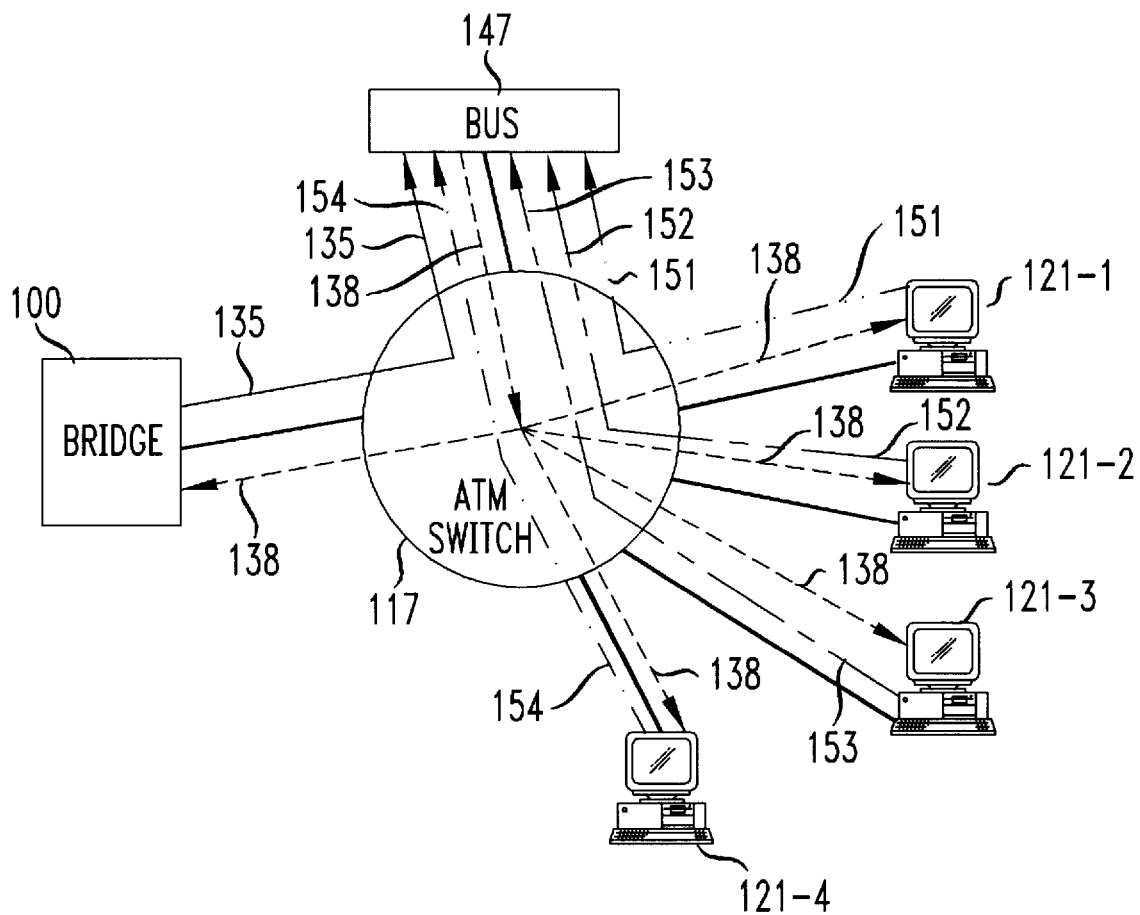
FIG. 2 shows a simplified diagram of the BUS connections to the LECs in the prior art ELAN of FIG. 1.
Figure 3:
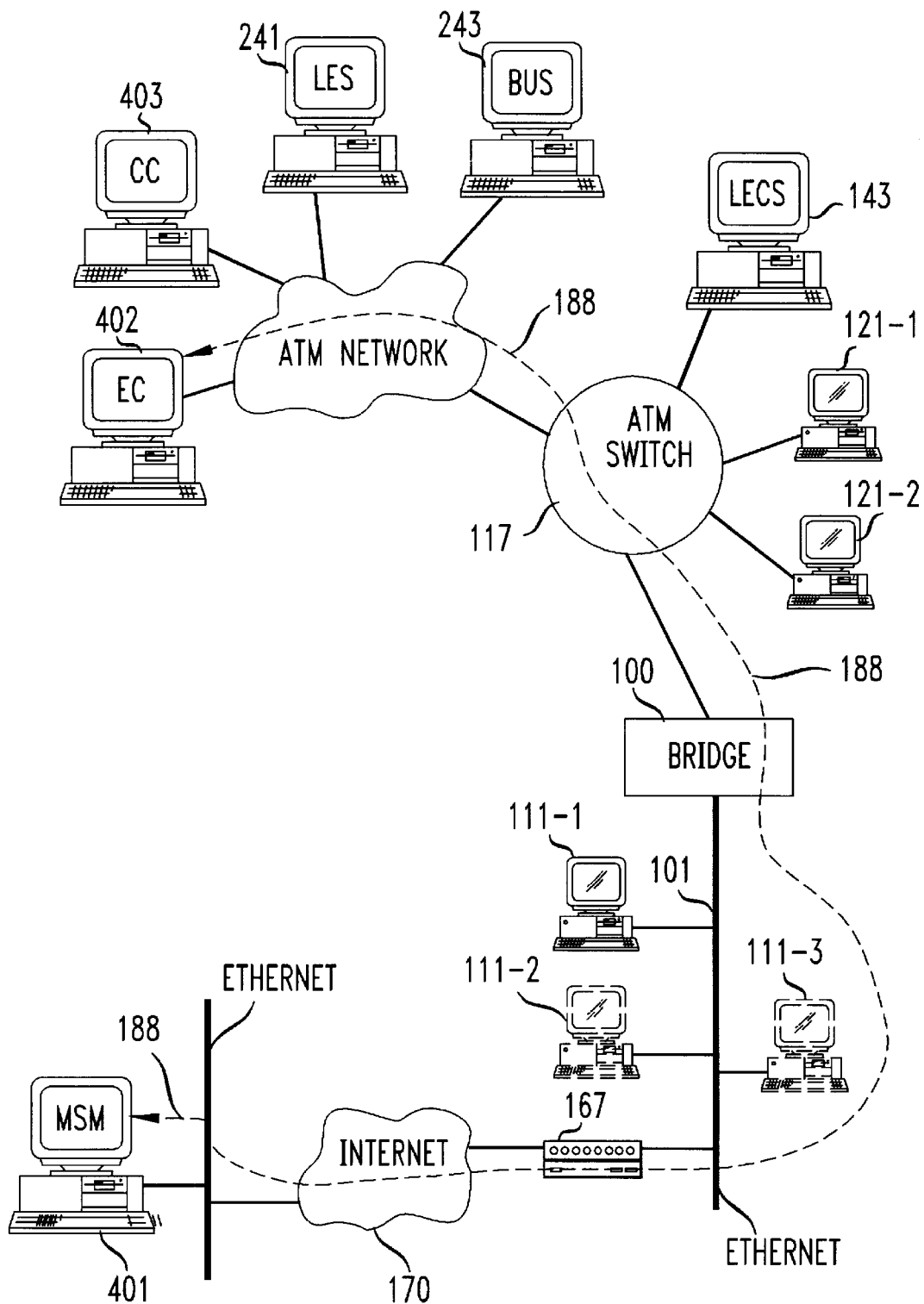
FIG. 3 shows the block diagram of the exemplary embodiment of the present invention.

With reference to FIG. 3, an exemplary embodiment of the invention is shown in which Multimedia Session Manager (MSM) 401, ELAN Configurator (EC) 402, and Conference Configurator (CC) 403 are used to form a temporary multimedia ELAN. Similar numerical reference numbers are used for those elements in FIG. 3 which are common to elements in previously described FIGS. 1 and 2.

When a user wants to initiate a multiparty multimedia session such as a multimedia conference, he or she would first access Multimedia Session Manager (MSM) 401. MSM 401 can be accessed through multiple networks such as (1) the Internet 170, which is generally available to a large community of interest; (2) special networks that are dedicated to session management; or (3) public networks. The function of the MSM 401 is to oversee and manage the session, coordinating the necessary resources. It can be implemented centrally, as well as distributed. Security procedures can be implemented to authenticate access to MSM 401. Based on the privileges granted to the user, special user groups may have special features and capabilities provided to them. MSM 401 can support a large variety of presentation interfaces and, based on a user's profile, the appropriate one is selected. For users with Internet access, a popular one could be the Hyper Text Marking Language (HTML) presentation format well known in the prior art.

In the embodiment of the invention in FIG. 3, the multimedia session being set up is a video conferencing session between end-stations 111-1, 121-1 and 121-2. In this exemplary embodiment, MSM 401 is assumed to reside on a Web server in the Internet 170 so that it is broadly available to all Internet users. It should be noted that each of the end-stations 111-1, 121-1 and 121-2 must be able to connect to the Internet in order to use MSM 401. The connectivity between all end-stations in the ELAN of FIG. 3 and Internet 170 is achieved through router 167, which is connected to Ethernet 101 on one port and to the Internet 170 on another port. A conferee can access the particular HTML page which provides access to MSM 401 via a Web browser such as Netscape on his/her desktop. The conferee reaches multimedia session manager 401 which is on a Web server by using the HyperText Transfer Protocol (HTTP) protocol, routing the request to retrieve the corresponding HTML page over router 167 to the Internet 170. The communications between the conferee (at end-station 121-1, for example) and router 167 is performed using LAN Emulation in a manner obvious to those skilled in the art.

In a specific implementation, a database on MSM 401 contains a database of all service subscribers. This database includes all end-station attributes, and optionally the conferencing capability attributes (such as support of video, audio etc.).

The subscribers are registered with MSM 401's database prior to the multimedia session. Alternatively, a conferee can subscribe himself/herself or other conferees at the time of initiating a multimedia session.

Table 1 shows an exemplary subscriber registration database stored in MSM 401.

TABLE 1

| Conferee Name | Conferee IP Address (Layer-3) | Conferee ATM Address (Layer-2) | ELAN Name |
| --- | --- | --- | --- |
| John Dow (121-1) | 135.15.16.182 | ATM1 | ATT_HO |
| Jim Who (121-2) | 135.15.16.12 | ATM2 | ATT_HO |
| Mary Conf (111-1) | 135.15.16.100 | ATM3 | ATT_HO |

Other information such as the MAC address of each conferee may be needed.

Note that the conferees in Table 1 are all in the same ELAN named ATT_HO, meaning that all conferees are in the same IP subnet 135.15.16. Here, IP is only used as an exemplary layer-3 protocol. Also note that while end-stations 121-1 and 121-2 are directly ATM attached, end-station 111-1 is attached to Proxy-LEC 100 in which case ATM3 is the ATM address of Proxy-LEC 100.

If the end-stations of all the conferees in Table 1 were not all in the same ELAN, then their IP addresses would indicate different IP subnets. Since end-stations in different subnets cannot form a single ELAN, they would need to be assigned IP addresses to ensure that all are in the same subnet. One such IP address assignment protocol is the Dynamic Host Configuration Protocol (DHCP), which is well known in the art. ELAN Configurator (EC) 402 can serve as the DHCP server to dynamically assign IP addresses to end-stations.

The layer-2 LAN Emulation technology requires that the dynamically assigned group of conferee end-stations, referred to hereinafter as the conferencing group, all be members of a single subnet. There are several ways of ensuring that all conferee end-stations in a conference group have the same layer-3 address: (1) all subscribers are in the same ELAN in which case they are already member of the same layer-3 subnet; (2) if all subscribers are not in the same ELAN, EC 402 dynamically allocates a layer-3 address to each conferee's end-station in a conference group at the time of configuring the temporary multimedia ELAN, as described above; and (3) if all subscribers are not in the same ELAN, a layer-3 address in the same subnet is pre-allocated to each end-station at the time of subscription to the service and kept as a permanent layer-3 address just for conferencing purposes. This pre-allocation can be performed by the MSM 401 or the EC 402. In the second method above, the assigned IP address represents a temporary layer-3 address assigned only for the lifetime of the multimedia session and is destroyed either by the end-station or EC 402 after the conference is completed. The temporary assignment is necessary so that the same addresses can later be re-used for other conference groups. When the multimedia ELAN becomes operational, the specified layer-3 protocol (e.g., IP) binds to the layer-2 address of the LAN Emulation Client. When a host leaves a conference group, it first unbinds the layer-3 protocol, then tears down the ELAN and surrenders the layer-3 address.

In the third approach above, the assigned layer-3 address is a permanent address, but is used by the end-station only for the subscribed multimedia application. In order to allow all permutations of conferee end-stations to form a conference group, the same layer-3 subnet is used for permanent addresses assigned to all conferees. At any point in time, more than one conference group may be active, but inasmuch as any one conferee will only be participating in only one conference at any given time, each active conference group forms an isolated temporary multimedia ELAN. Therefore, sharing the same layer-3 address does not cause any conflict. This grouping by layer-3 addresses in forming a subnet, is a form of logical partitioning as different groups sharing a common subnet are isolated from one another. This approach yields a very efficient use of workgroup resources by having the Network emulating a hardware based "logical multicasting" service using the BUS point-to-multipoint feature.

EC 402 can be physically on the same system with MSM 401. Alternatively, EC 402 can be a physically different system, and may reside on the ATM network, as illustrated in FIG. 3. If EC 402 is on a different system, then a connection between MSM 401 and EC 402 is required. This connection can be a simple TCP/IP socket connection over the Internet, an ATM connection, a serial line, a modem, or even an ISDN connection, or some other means. In FIG. 3 the communications between MSM 401 and EC 402 is provided via router 167 along connection 188. Note that when EC 402 has a packet to send to MSM 401, it sends the data packet over an ATM connection to bridge 100 using the LAN Emulation protocol described hereinabove in the Background of the Invention section. Thereafter, bridge 100 de-capsulates the MAC packet, stripping off the ATM header, and forwards it to router 167. In turn, router 167 forwards the packet to the next hop router on the path in the Internet. Finally, the last router on the path which is on the same Ethernet as the MSM 401, forwards the packet to the destination. Connection 188 is thus composed of connection-oriented ATM components (between EC 402 and bridge 100) and a connection-less component that traverses several routers in the Internet.

Once a list of conferees is selected, MSM 401 conveys the configuration attributes of the conferees such as the IP address, ATM address and ELAN Name to EC 402, requesting the formation of a new multimedia ELAN.

EC 402 is responsible for finding an available LAN Emulation Server (LES), such as 241, and an available Broadcast and Unknown Server (BUS), such as 243, which can be designated to serve the temporary multimedia ELAN formed from the end-stations of the selected conferees. EC 402 keeps a database of all LESes and BUSes and their availability state. It also ensures that the LES serving the new ELAN is designated as "in use" in its LES database so that subsequent conferences will use addresses of another available LES and BUS. All LESes may reside on the same physical system or different systems. All BUSes may reside on the same physical system or on different systems.

EC 402 is responsible for coordinating establishment of the new multimedia ELAN between the conferees' end-stations. EC 402 either creates a new configuration file within LAN Emulation Configuration Server (LECS) 143 corresponding to the ELAN just between the conferees' end-stations, or directly sends the address of the associated LES to each conferee's end-station. EC 402 also sends an appropriate configuration message to each conferee's end-station so that a new LAN Emulation Client is initialized as defined by using the LANE protocol, and informs MSM 401 that ELAN formation is completed. In turn, MSM 401 may inform the conferee who is arranging the conference that formation of the ELAN has been completed.

Once EC 402 determines that the ELAN formation has been completed, it informs Conference Configurator (CC) 403 so that the selected end points are configured to participate in a conference over the newly created multimedia ELAN. At this stage, the MSM 401 optionally sends conferencing attributes of each conferee to CC 403.

CC 403 either starts executing a multimedia application already residing on each conferee's end-station, or optionally sends the executables of the selected multimedia application in real-time. CC 403 may choose to activate or send certain set of executables based on the conferencing capabilities of each conferee (audio only, video only etc.). When CC 403 sends the multimedia executables to each conferee it may use a "JAVA"-like software language, which is well known in the prior art, which destroys the application at the completion of the session.

The ATM address of BUS 243 is known to each conferee's end-station so that each end-station sends the data streams (audio, video and data) to BUS 243, which in turn forwards these streams to all other conferees via the BUS PtmP connection (see FIG. 2).

The CC 403 mainly configures the multimedia application on each end-station at the beginning of a conference. In addition, once the conference has begun, CC 403 may participate in a multimedia session as, for example, a video server serving playback video files from its database to all LECs in the ELAN, by (1) forwarding the video file to BUS 243; and (2) configuring the application on each LEC so that it can (a) view the file, and (b) send control messages to CC 403 such as stop, pause and rewind.

During the course of the multimedia conference, MSM 401 can be used to (1) add a conferee, (2) drop a conferee, and (3) terminate the conference. The addition of new conferee to an ongoing conference requires a new LEC to be added to the already configured multimedia ELAN by EC 402, and initiation of the conference on the new conferee's end-station by CC 403. Similarly, dropping an existing conferee requires termination of the corresponding LEC's membership from the multimedia ELAN by EC 402, and termination of conference on that conferee's end-station by CC 403. Termination of the conference is achieved by (1) terminating membership of all LECs from the ELAN by EC 402; (2) changing the state of the corresponding LES and BUS to "available" in the database in the EC 402; and (3) termination of the conference on each conferee's end-station by CC 403. All these session management functions can be achieved using the Web browser and the communications between the common gateway program (cgi) programs on MSM 401, and EC 402 and CC 403, in a manner obvious to one skilled in the field.

In the embodiment of the present invention described hereinabove, the multimedia application can be a multicast application in which each end-station is a receiver and transmitter, or one in which one end-station is a transmitter and all others are receivers, or one in which several end-stations are transmitters and receivers, and all others are receivers. The multimedia application may include audio, video, still pictures, control information (pause, stop, play, etc.), or other forms of data. The multimedia session can be conducted between only ATM attached end-stations which are already all on the same ELAN, between only ATM attached end-stations which are already members of different ELANs, between ATM attached end-stations and Legacy LAN attached end-stations which are all on the same ELAN, between ATM attached end-stations and Legacy LAN attached end-stations which are already members of different ELANs, between ATM attached end-stations and Legacy LAN attached end-stations which are not readily a member of any ELAN, but have the capability to become part of an ELAN, or between ATM attached end-stations which are not readily a member of any ELAN, but have the capability to become part of an ELAN.

Figure 4:
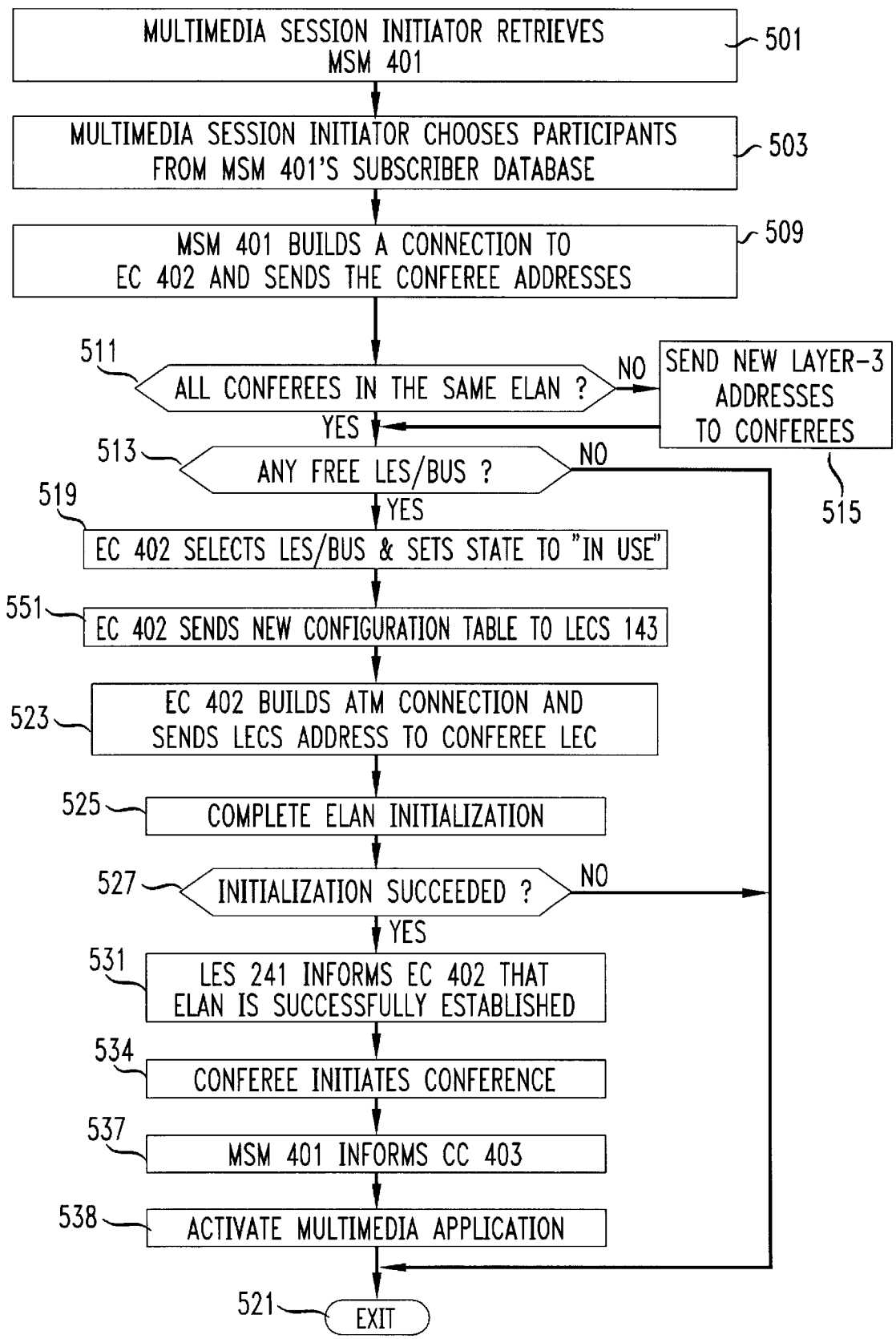
FIG. 4 shows a exemplary process for forming a temporary multimedia ELAN between the participants of a multimedia session shown in FIG. 3.

FIG. 4 shows an exemplary process of initiating a multimedia session and forming a multimedia ELAN. The process commences at step 501 when a conferee at end-station 121-1 (or a conference operator which arranges the conference but does not participate in the conference) decides to initiate a conference call. In step 501, the conferee at end-station 121-1, who initiates the conference, retrieves an HTML page which contains the video conference setup page from MSM 401. Next, in step 503, the conferee at end-station 121-1 chooses the conferees at end-stations 111-1 and 121-2 to participate in the conference call. In FIG. 3, it has been assumed that all the conferee's end-stations are members of the same ELAN. However, this invention does not preclude conferees at end-stations which are (1) in different existing ELANs, (2) in different type of ATM networks, or (3) even in non-ATM networks as, for example, private-line connected, or dial-up end-stations. These end-stations can be reached through special gateways.

In step 509, MSM 401 builds connection 188 and relays the conferee/end-station list and the attributes of each conferee's end-station, including the layer-3 address and ATM address of the conferee's desktop, to EC 402, which is responsible for configuring the selected end-stations in a new multimedia ELAN. Table 1, discussed above, shows an example of a conferee table.

Next, at conditional branch point 511, EC 402 checks to determine if all the conferee's end-stations are in the same ELAN (or subnet). If the test result in step 511 is YES, control passes to conditional branch point 513, which tests to determine if there is a free LES and BUS available to serve the new multimedia ELAN. If the test result in step 513 is NO, indicating that there are not any available resources to serve the multimedia ELAN, the process exits at step 521. If all the conferee's end-stations are in the same ELAN, an alternative implementation can be executed, in which the multimedia ELAN construction step can be by-passed, since all conferees are already in the same ELAN. However, since the BUS will be not be able to receive the multimedia data streams from all conferees and broadcast them to all others and simultaneously fulfill its other broadcast duties, a special multicast PtmP connection can be designed on the BUS with its leaves being the end-stations of the conferees. Although this implementation requires a non-standard BUS (which is capable of supporting multiple PtmP connections, one for broadcast only, and the others for special multicast traffic), it is also a viable implementation. Also, it should be noted that this non-standard implementation is primarily for the case in which all conferees are in the same ELAN. Otherwise, a multimedia ELAN must be formed, and consequently, a standard BUS can be used without needing additional PtmP connections for multicasting.

If the test result in step 511 is NO, indicating that the conferees are currently in different subnets, control passes to step 515 at which the EC 402 acts as a DHCP server and sends new IP addresses to each conferee's end-station (DHCP client) to make sure all end-stations are all in the same IP subnet. Thereafter, control passes to step 513.

If the test result in step 513 is YES, control passes to step 519 at which EC 402 selects a free LES and BUS to serve the new multimedia ELAN. It determines the ATM addresses of the LES and BUS serving the new multimedia ELAN, and a name to identify the multimedia ELAN. It also sets the availability state of the selected LES and BUS to "in use". Control passes to step 551 at which ELAN Configurator 402 sends a message to LAN Emulation Configuration Server 143 to populate the new ELAN configuration information table including (1) ELAN name, (2) LES ATM address, and (3) the ATM addresses of all the conferee's end-stations, which will be treated as LECs. Sending the BUS ATM address is not required as each LES knows its paired BUS's ATM address.

Upon completing step 551, EC 402 establishes an ATM connection to each conferee's end-station in step 523 (or the gateways if the conferee is not ATM attached) to send the address of LECS 143, and a message to startup a new LEC on each conferee's end-station for the new multimedia ELAN indicated by the assigned ELAN Name. If the conferee is behind a Proxy-LEC, then only the Proxy-LEC receives the configuration message. Thereafter, each new LEC receiving the startup message establishes a connection to LECS 143 in step 525, and registers with LECS 143. In turn, LECS 143 sends the ATM address of the newly assigned LES 241 to each of end-stations 121-1, 121-2 and bridge 100. BUS 243 is assumed to be paired with LES 241, and LECs 121-1, 121-2 and 100 will be able find the ATM address of BUS 243 as described herein above in the Background of the Invention.

The LECs complete their initialization with the new multimedia ELAN in step 525. Thereafter, control passes to step 527, at which LES 241 determines whether initialization of all the LECs succeeded. If the test result in step 527 is NO, indicating that initialization has failed, the process is exited at step 521.

If the test result at step 527 is YES, indicating that initialization of the new multimedia ELAN has been successfully completed, control passes to step 531 at which LES 241 informs EC 402 that the ELAN configuration is completed and that the new multimedia ELAN is ready to begin the conference. EC 402 may at this time inform MSM 401 about the state of ELAN formation in order to inform the conference originator of the session of the status (failed or succeeded) of the conference. However, this step is optional. At the next step 534, the conference originator chooses a "start conference" option on MSM 401's HTML page. The nature of the multimedia session depends on the application and could be a combination video conferencing, whiteboarding, or a video on demand type of application.

At the next step 537, the MSM 401 informs CC 403 of the conference attributes of the end-stations of the conferees which are ready to participate in a conference over the newly created multimedia ELAN. At step 538, CC 403 either executes a multimedia application all ready residing on each conferee's end-station, or optionally sends the executables of the selected multimedia application in real-time, for use during the life-time of the session.

Figure 5:
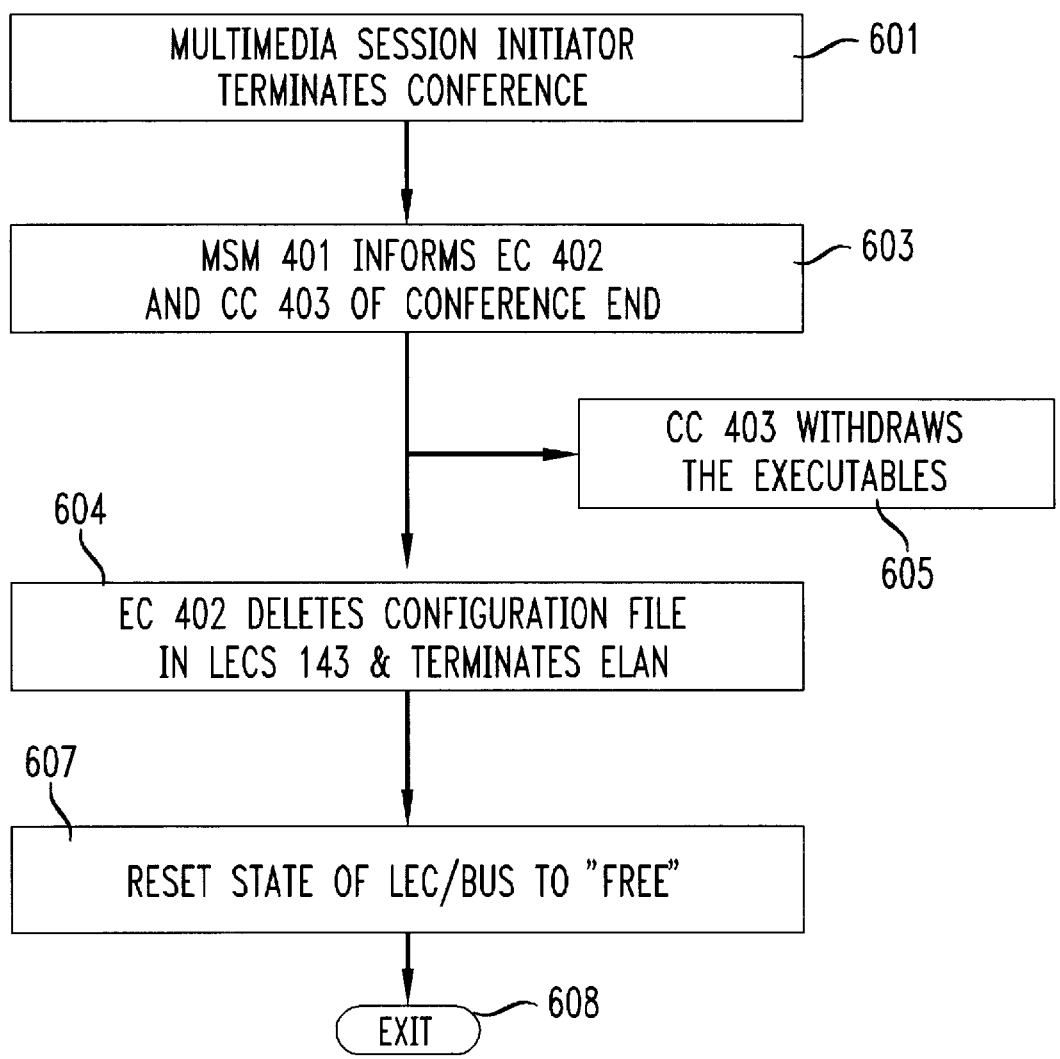
FIG. 5 shows a exemplary process for terminating a multimedia ELAN after completion of a multimedia session.

The process for termination of a multimedia session is shown in FIG. 5. The process commences at step 601 when end-station 121-1 terminates the conference using the MSM 401. At step 603, MSM 401 informs EC 402 and CC 403 that the conference is completed. In turn, at step 605, CC terminates the conference application on each end-station (or withdraws the executables). In parallel, at step 604, EC 402 sends a message to LECS 143 to delete the configuration file which corresponds the multimedia ELAN, and informs LES 241 so that it drops all its connections from LECs 121-1, 121-2 and 100 in the multimedia ELAN. At the next step 607, EC 402 changes the state of the now freed up LES/BUS to "free" in its database. The process is exited at step 608.

The above-described embodiment is illustrative of the principles of the present invention. Other embodiments could be devised by those skilled in the art without departing from the spirit and scope of the present invention.

The invention claimed is:

1. Apparatus for forming a multimedia session among selected end-stations connected to one or more existing Emulated Local Area Networks (ELANs), said apparatus comprising:

means for setting up a separate temporary multimedia ELAN connected to said selected end-stations on top of said one or more existing ELANs; and means for temporarily allocating a LAN Emulation Server (LES) and a Broadcast and Unknown Server (BUS) to said temporary multimedia ELAN.

2. Apparatus in accordance with claim 1 further comprising means for storing ELAN attributes of each of said selected end-stations.

3. Apparatus in accordance with claim 1 further comprising means for storing multimedia session attributes of each of said selected end-stations.

4. Apparatus in accordance with claim 2 further comprising means for sending the ELAN attributes of each of said selected end-stations to said means for setting up a separate temporary multimedia ELAN.

5. Apparatus in accordance with claim 2 wherein a stored ELAN attribute of an end-station is its layer-3 address.

6. Apparatus in accordance with claim 2 wherein a stored ELAN attribute of an end-station is its ATM address.

7. Apparatus in accordance with claim 2 wherein a stored ELAN attribute of an end-station is its ELAN name.

8. Apparatus in accordance with claim 1 wherein said means for temporarily allocating comprises means for storing the availability of one or more LESes and one or more BUSes on said one or more ELANs and for selecting an available one of said one or more LESes and an available one of said one or more BUSes to allocate to said temporary multimedia ELAN.

9. Apparatus in accordance with claim 2 further comprising means for acquiring ELAN attributes from each of said selected end-stations.

10. Apparatus in accordance with claim 2 further comprising means for assigning a layer-3 address to each of said selected end-stations.

11. Apparatus in accordance with claim 10 wherein said means for assigning assigns a permanent layer-3 address to each of said selected end-stations.

12. Apparatus in accordance with claim 10 wherein said means for assigning assigns a temporary layer-3 address to each of said selected end-stations at the time of setting up the temporary multimedia ELAN.

13. Apparatus in accordance with claim 8 further comprising means for temporarily activating a LAN Emulation Client (LEC) at the time of setting up the temporary multimedia ELAN.

14. Apparatus in accordance with claim 13 further comprising means for adding or dropping a LEC after the temporary multimedia ELAN is set up.

15. Apparatus in accordance with claim 14 further comprising means for terminating the temporary multimedia ELAN by dropping all LECs in the temporary multimedia ELAN.

16. Apparatus in accordance with claim 15 further comprising means for changing to available the LES and BUS allocated to the temporary multimedia ELAN in said means for storing upon terminating said multimedia ELAN.

17. Apparatus in accordance with claim 3 wherein the multimedia session attributes comprise the audio and video compression techniques used by each of said selected end-stations.

18. Apparatus in accordance with claim 1 further comprising means for acquiring multimedia attributes from each of said selected end-stations.

19. Apparatus in accordance with claim 18 further comprising means for activating an existing multimedia application on each of said selected end-stations.

20. Apparatus in accordance with claim 18 further comprising means for sending a multimedia application to each of said selected end-stations at the time of setting up the temporary multimedia ELAN.

21. Apparatus in accordance with claim 20 further comprising means for withdrawing said multimedia application from each of said selected end-stations after the end of said multimedia application.

22. Apparatus in accordance with claim 20 wherein said means for sending a multimedia application comprises means to configure the multimedia application in accordance with the multimedia attributes of said selected end-stations.

23. Apparatus in accordance with claim 1 wherein said BUS allocated to said temporary multimedia ELAN receives a multimedia data stream from at least one of said selected end-stations and broadcasts it to the other of said selected end-stations.

24. A method for forming a multimedia session among selected end-stations connected to one or more existing Emulated Local Area Networks (ELANs), comprising the steps of:

setting up a separate temporary multimedia ELAN connected to said selected end-stations on top of said one or more existing ELANs; and temporarily allocating a LAN Emulation Server (LES) and a Broadcast and Unknown Server (BUS) to said temporary multimedia ELAN.

25. The method of claim 24 further comprising the step of storing ELAN attributes of each of said selected end-stations.

26. The method of claim 24 further comprising the step of storing multimedia session attributes of each of said selected end-stations.

27. The method of claim 25 wherein a stored ELAN attribute of an end-station is its layer-3 address.

28. The method of claim 25 wherein a stored ELAN attribute of an end-station is its ATM address.

29. The method of claim 25 wherein a stored ELAN attribute of an end-station is its ELAN name.

30. The method of claim 24 wherein said step of temporarily allocating a LES and a BUS comprises the steps of determining the availability of one or more LESes and one or more BUSes on said one or more ELANs, and selecting an available one of said one or more LESes and an available one of said one or more BUSes to allocate to said temporary multimedia ELAN.

31. The method of claim 25 further comprising the step of acquiring ELAN attributes from each of said selected end-stations.

32. The method of claim 25 further comprising the step of assigning a layer-3 address to each of said selected end-stations.

33. The method of claim 32 wherein said step of assigning comprises the step of assigning a permanent layer-3 address to each of said selected end-stations.

34. The method of claim 32 wherein said step of assigning comprises the step of assigning a temporary layer-3 address to each of said selected end-stations at the time of setting up the temporary multimedia ELAN.

35. The method of claim 30 further comprising the step of temporarily activating a LAN Emulation Client (LEC) at the time of setting up the temporary multimedia ELAN.

36. The method of 35 further comprising the step of adding or dropping a LEC after the temporary multimedia ELAN is set up.

37. The method of claim 36 further comprising the step of terminating the temporary multimedia ELAN by dropping all LECs in the temporary multimedia ELAN.

38. The method of claim 37 further comprising the step of changing to available the LES and BUS allocated to the temporary multimedia ELAN upon terminating said multimedia ELAN.

39. The method of claim 26 wherein the multimedia session attributes comprise the audio and video compression techniques used by each of said selected end-stations.

40. The method of claim 24 further comprising the step of acquiring multimedia attributes from each of said selected end-stations.

41. The method of claim 40 further comprising the step of activating an existing multimedia application on each of said selected end-stations.

42. The method of claim 40 further comprising the step of sending a multimedia application to each of said selected end-stations at the time of setting up the temporary multimedia ELAN.

43. The method of claim 42 further comprising the step of withdrawing said multimedia application from each of said selected end-stations after the end of said multimedia session.

44. The method of claim 42 wherein said step of sending a multimedia application comprises the step of configuring the multimedia application in accordance with the multimedia attributes of said selected end-stations.

45. The method of claim 24 wherein said BUS allocated to said temporary multimedia ELAN receives a multimedia data stream from at least one of said selected end-stations and broadcasts it to the other of said selected end-stations.

* * * * *

UNITED STATES PATENT AND TRADEMARK OFFICE
CERTIFICATE OF CORRECTION

PATENT NO. : 5,812,552
DATED : September 22, 1998
INVENTOR(S) : Arora et al.

It is certified that error appears in the above-identified patent and that said Letters Patent is hereby corrected as shown below:

On the title page, item [73], Assignee should read --AT&T Corp., New York, N.Y.--.

Signed and Sealed this

Thirty-first Day of August, 1999

Attest:

Q. TODD DICKINSON

*Attesting Officer*   *Acting Commissioner of Patents and Trademarks*